United States Patent Office 3,495,066
Patented Feb. 10, 1970

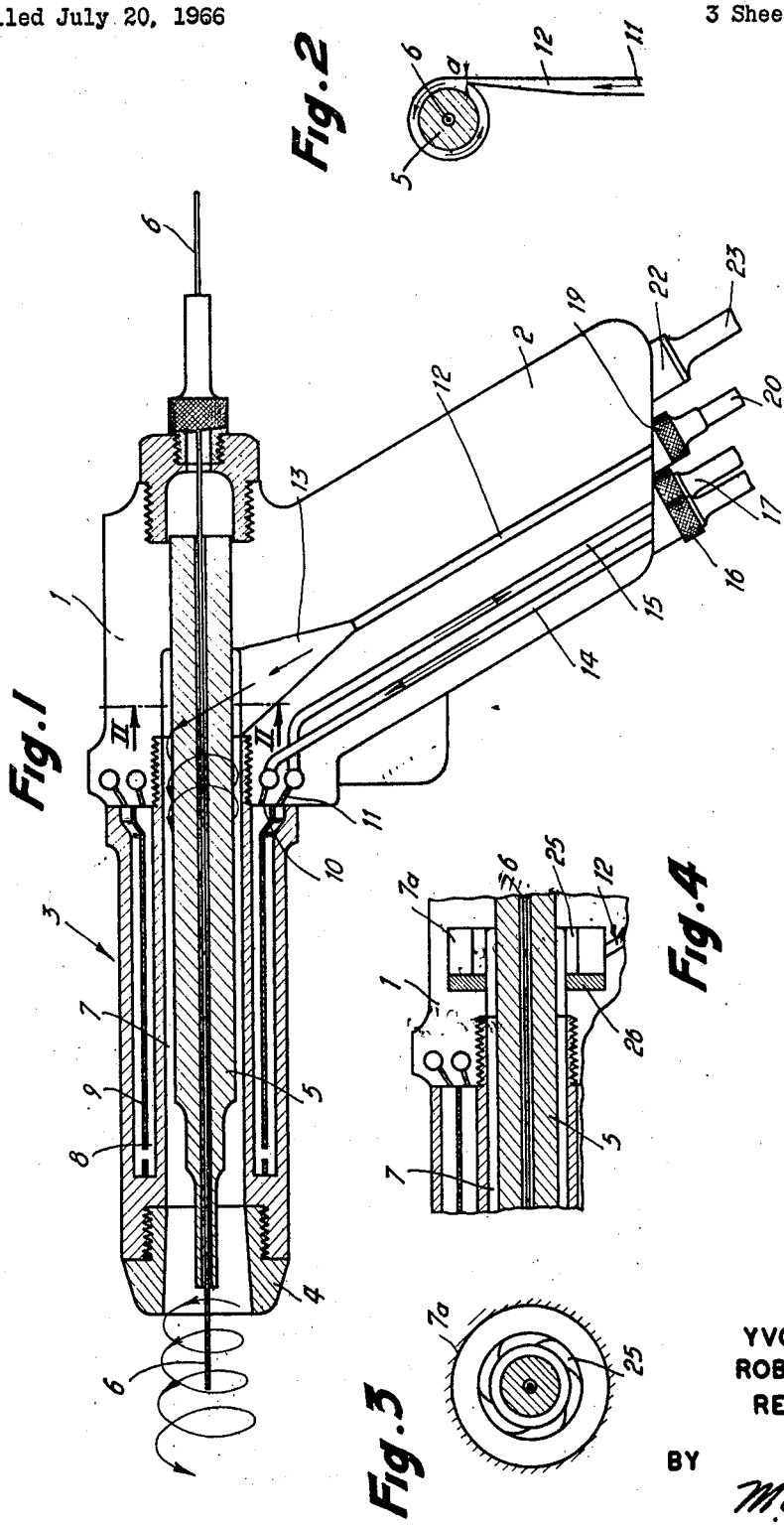

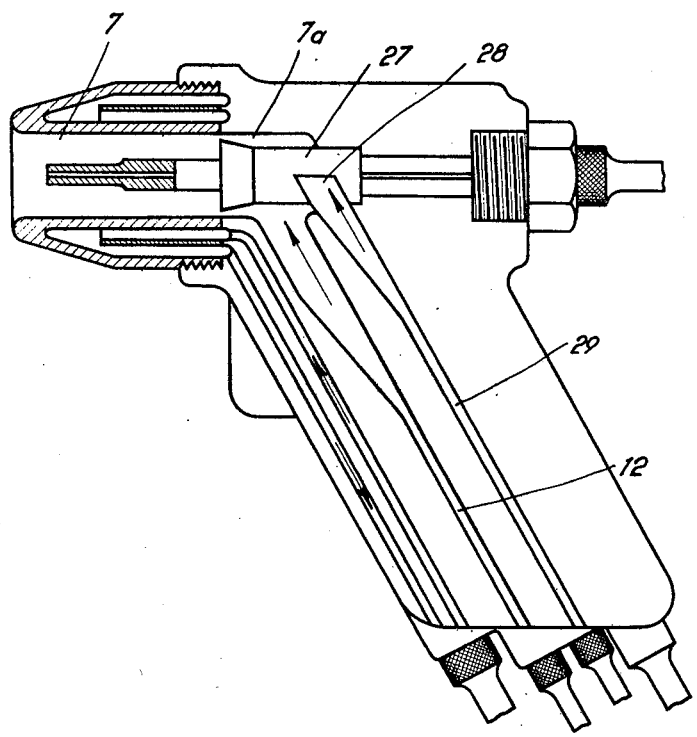

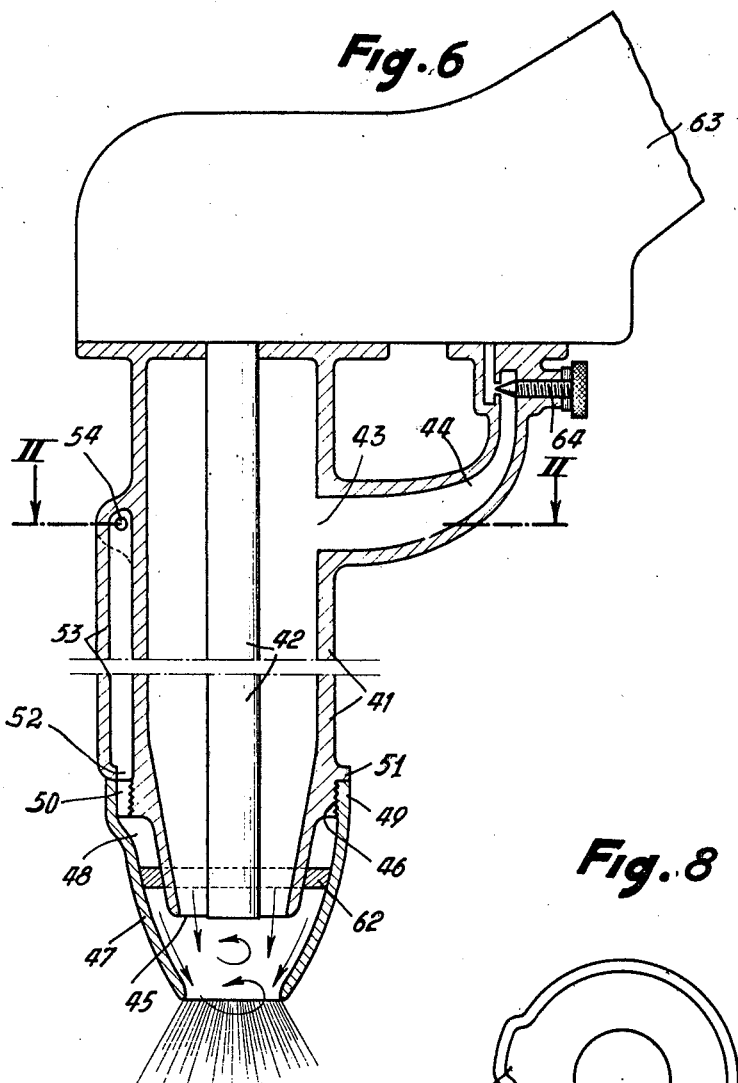
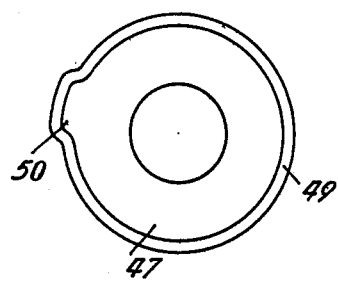
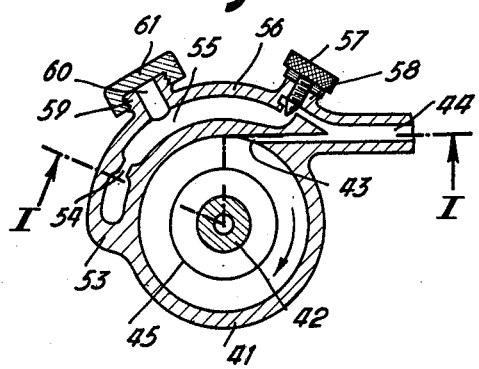

3,495,066
ELECTRIC-ARC WELDING WITH A PROTECTIVE GAS FLUX
Yvon Broyard, 14 Rue Eustache-Lesueur 80, Montdidier, France; and Robert Guetet, 39 Avenue de Friedland 75, and René Nautre, 12 Rue Desaix 75, both of Paris, France
Filed July 20, 1966, Ser. No. 566,676
Claims priority, application France, July 21, 1965, 25,514
Int. Cl. B23k 9/00, 9/16, 35/38
U.S. Cl. 219—74                    5 Claims

ABSTRACT OF THE DISCLOSURE

Welding process and torch using a consumable electrode and an inert gas flow forming a protective sheath around said electrode and the arc issued therefrom, wherein said flow is formed as a free spiral vortex coaxial with said electrode and arc and rotating in a direction such that the electron deviation by the electromagnetic field created by said vortex ionised by the arc will be axipetal.

---

This invention relates to electric-arc welding with a protective gas flux. According to this welding method, the place being welded is protected from the disturbing action of oxygen and water vapour in the atmosphere by a protective gas jet. Hitherto, use has always been made of jets composed solely of a protective gas, in which jets the lines of flow are straight. With such jets, this welding method has various disadvantages. These include the following. The jet must have a certain stability if its protective action is to be adequate, and this necessitates a relatively high flow velocity, which causes a considerable consumption of generally expensive protective gas; in spite of this, at flow velocities involving an acceptable, although already expensive consumption of protective gas, the stability of the jet is low, and it is deformed by the slightest air current, so that it is impossible to weld in the open air or even to ventilate the welding shop, and welding has to be carried on in a closed room, for the slightest displacements of the jet make the weld porous and cause blow holes. Furthermore, the molten metal is not uniform in colour, and this indicates temperature differences; the pool is agitated and there is a great deal of crackling and flying molten metal, which enters the welding gun or torch and quickly clogs it, necessitating frequent and very time-consuming cleaning; this flying metal is also liable to produce short-circuits in the guns or torches. Finally, some of the protective gas, heated by welding, rises up to the welder's face in the form of an ascending hot current and makes him uncomfortable or even ill, as these protective gases are irritating and slightly toxic.

The object of this invention is to effect an improvement in these various respects.

The invention is based on the observation that, although the function of the jet, which is to protect the place being welded, demands the use of a protective gas and a stable jet, its stability is not necessarily linked with the flow velocity of the protective gas, i.e. its delivery, and that it should be possible to dissociate it therefrom and obtain it independently of the delivery, as has been confirmed by experience. The original and basic feature of the invention is, therefore, that at least part of the protective jet comprises a solid or tubular stream actuated by a velocity that is different to and much higher than the flow velocity of the protective gas, and stabilises the whole jet. The effects are particularly satisfactory when the velocity of a rapid rotational movement of the stream on itself forms the stabilisation velocity. The axial velocity of flow of the protective gas can then be reduced, whereby its consumption is cut down considerably, and by more than 50%, for the stability of the jet and its resistance to disturbances are ensured by the rotational velocity which has no effect on the delivery of the gas and may be as high as desired. Welding costs are thus considerably reduced while the quality of the weld is increased as the jet resists external disturbances better, so that porosity and blow holes are prevented; furthermore, the operation can be carried out in an uncovered place in a workshop, which may be ventilated, or even outside. It is also found that the colour of the molten metal becomes uniform, indicating uniformity of temperature; crackling and flying material are eliminated and, together with the elimination of the latter, the gun ceases to be clogged, so that it no longer needs to be cleaned frequently and there is no risk of the occurence of short-circuits in it. Finally, the rising currents of protective gas heated by welding are deflected laterally by the rotational movement and well away from the air breathed by the operator.

The aforementioned effects are increased when, according to a development of the invention, the rotational movement of the jet is a velocity-potential flow, for instance of the free-eddy or well-eddy type. For these flows are organised flows with a characteristic structure and internal energy exchange, so that the energy is the same at any part of the flow, giving them very great stability and high resistance to outer disturbances.

The rapidly rotating stream may form the whole of jet, in which case it comprises a protective gas or gas mixture, or, to reduce still further the consumption of the protective gas, it may be a thin-walled tubular stream, and in this case it may be composed of a protective gas, which may be surrounded if desired by a stream of another fluid, for example air, which may rotate if desired, and is designed to increase by its mass and velocity the force of the jet in order to increase its stability and resistance to disturbances, or else this rapidly rotating tubular stream is formed by such a fluid and then surrounds another solid or tubular stream, which may rotate if desired and is composed of a protective gas or a mixture of such gases.

Although it is preferable to use the velocity of a rotational movement to stabilise the jet, it is also possible to use for this purpose, by making it high enough, the flow velocity of a non-rotary stream of a common gas, for example air, coaxially surrounding a solid or annular stream of a slowly flowing protective gas.

Another effect of the rotation of the protective stream is that, the eddy of protective fluid being intensively ionised by the arc, the rotation of the electrons released results in the appearance of an electromagnetic field along the axis of the eddy. In the case of an anode made of a ferrous or ferromagnetic metal, this field exerts on the metal emitted by the anode a magnetic attraction which is added to the electromotive force caused by the potential difference at the terminals of the arc. This field also causes the electrons of the ionised flux to be deflected transversely to the direction of their movement, i.e. transversely to the axis. If the field is appropriately oriented, i.e. the eddy rotates in an appropriate direction, this being an additional characteristic of the invention, so that this deviation transversely to the axis is centripetal and not centrifugal, the deflected electrons, withdrawn from the gaseous fluxes, are injected in the electrical circuit of the arc and increase its amperage. The device thus acts as an electron pump. As a result, the eddying gaseous flux, which is ionised and thus, at least partly, freed from its electrons, is ionised positively, and its oxidising action is reduced, even if it contains free oxygen; indeed, it has a reducing action. Its protective action is thus increased and oxidation of the weld is reduced. The metal deposited is perfectly sound and compact, and its connection with the underlying metal is perfect, as has been proved by radiographic examination. The reducing action of the gas is exerted on the cathode on which the jet spreads out, and from which it extracts the electrons necessary for the cession of its ionisation, i.e. the neutralisation of its positive charge. Heat is liberated during this neutralisation, and this benefits the connection between the metal applied and the base metal, commonly termed "wetting."

To produce a protective jet according to the invention, the welding gun or torch is provided with means interposed on the channel for the formation of the jet and adapted to cause the jet issuing from the gun or torch to include a stream with a velocity different to and much greater than the flow velocity of the protective gas. In one simple embodiment, these means comprise a protective gas conduit which opens into the usual annular conduit round the wire-guide sleeve, transversely to the axis of the latter and substantially tangentially to its outer wall, the dimension of the conduit perpendicularly to the axis being less than the radial dimension of the annular conduit.

In a preferred embodiment, the tangential inlet nozzle is surrounded by an annular nozzle which opens downstream of the outlet of the nozzle that it surrounds.

What ever the type of flow of the protective stream may be, another improvement relating to welding guns is that the connections for the pipes supplying protective gas, for the circulation of cooling liquid and of the electrical conductor are disposed at the bottom end of the handle or butt, the corresponding conduits being formed within the latter.

The accompanying drawings show non-restrictive exemplified embodiments of semi-automatic electric arc welding guns using protective gas fluxes and improved according to the invention.

In the drawings:

FIG. 1 is a section of a first embodiment of such a gun along the axis of its barrel;

FIG. 2 is a section along the line II—II;

FIGS. 3 and 4, which are analogous to FIGS. 1 and 2 respectively, show a variant of the means for rotating the stream of protective gas flux;

FIG. 5 is a view, analogous to FIG. 1, of a variant of the gun;

FIG. 6 is a section, along the line VI—VI in FIG. 7, along another variant of a gun;

FIG. 7 is a corresponding cross-section along the line VII—VII in FIG. 6, and

FIG. 8 is an end view of the detachable nose of the annular nozzle.

In the arrangement shown in FIG. 1, the gun is of the conventional type, comprising a body 1 with a handle or butt 2, to which body a barrel 3 is secured, onto the end of which a tip 4 is screwed. A sleeve 5 made of insulating material is disposed on the axis of the barrel 3; this sleeve is also secured in the body 1 and an axial aperture, through which the welding wire 6 carrying the electric welding current passes, runs through it from end to end. This wire-guide sleeve 5 has a diameter less than the inside diameter of the barrel 3 and defines with the latter an annular chamber 7 designed for the formation and passage of the protective gas jet and forming an extension of a chamber 7a formed in the body 1 round the wire-guide 5. In the barrel 3 there is formed an annular chamber 8 divided, by a cylindrical partition 9, into two coaxial compartments communicating with one another at one end and, at the other end, abutting on the body 1, with conduits 10, 11 for the admission and discharge respectively of a cooling fluid, for example water.

The originality of this arrangement is that the conduit 12 supplying the protective gas to the annular chamber 7 for the formation of the jet opens into the latter tangentially (FIG. 2) via a portion widened along the generatrices of the cylindrical wall of the chamber 7a. In this case, the thickness $a$ (FIG. 2) of this widened portion 13 of the conduit 12 is less than the radial width of the annular chamber 7. Owing to the latter feature the stream of air which issues from the widened portion 13 into the chamber 7a is wound round itself in the latter chamber and the chamber 7, in which its flow is of the free-spiral vortex type. It is known that in this type of vortex the kinetic moment is the same at any distance from the axis. The tangential speed of rotation of the vortex hence increases centripetally from the vortex outer periphery to fairly adjacent the axis, much higher than in a forced vortex. Consequently, the speed of rotation of the freed electrons is high enough to generate a substantially electromagnetic field the intensity of which increases centripetally. This electromagnetic field causes a centripetal deviation of the electrons and retains the molten metal against spattering. Another originality is that the conduits 14 and 15 for the supply and discharge of a cooling fluid are formed in the handle 2 and run towards its bottom end, to which the connections 16 and 17 for the admission and discharge of the fluid are attached; the same applies to the conduit for the supply of protective gas and its connection 19 for the conduit 20 for the supply of the gas, and to the conductor (not shown) of the electric current which conductor terminates at the connection 22 to which the pipe 23 is connected.

The cross-section of the jet outlet is larger than the cross-section of the annular chamber 7, so that a rapidly rotating tubular stream issues from the barrel. The velocity of this stream is about 10 to 20 metres a second, to make it stable enough, while the axial flow velocity is reduced to about 0.50 to 1 metre a second, in contrast to the usual velocity of 1 to 2 metres a second.

This section of the jet outlet may also be equal to or slightly less than the section of the annular chamber 7, in which case the jet is a solid stream.

In the variant shown in FIGS. 3 and 4, the conduit 12 for the supply of protective gas no longer opens tangentially into the annular chamber 7a formed in the body 1, and the latter chamber communicates with the annular chamber 7 via apertures 25 passing through the cylindrical wall of a ring 26 disposed in the chamber 7a, encircling at a distance therefrom the wire-guide sleeve 5 and having a flange by which it is centred in the chamber 7a, and the said apertures 25 are formed (FIG. 4) so as to communicate a circumferential movement to the gas flowing therein.

Another variant (not shown) comprises the replacement of the ring 26 by a ring centred on the wire-guide 5 and formed with apertures opening on its two opposite surfaces, opposite the annular chamber 7, these apertures being inclined so as to impart a spiral motion to the gas passing through them, the inclination of the apertures then being such that the tangent of the angle of the spiral is less than one-fifth, and preferably less than one-tenth.

In the embodiment shown in FIG. 5, the gun is similar to the one shown in FIG. 1, but the annular chamber 7 for the formation of the rotary jet, between the wall of the barrel and the wire-guide, has a greater radial dimension, and, in the central portion of the chamber 7a of the body 1, there is a cylindrical nozzle 27 at which the widened portion 28 of a conduit 29 formed in the butt terminates tangentially.

The conduits 29 and 30 may be used for the admission of two different gases and the protective stream then comprises two rotating tubular streams which are coaxial and in contact with one another. The inner stream may be composed of a protective gas and the outer stream of a common gas, for example air, used only to increase the stability of the jet. Alternatively, these two streams may be composed of different protective gases. If it is desired to mix these two different gases, the nozzles 27 may terminate in a divergent portion, or the barrel may be convergent, for the whole or part of its length, towards the outlet; these two arrangements may, moreover, be present together. Flow through the nozzle 27 may be forced or merely induced by the reduced pressure produced at the aperture of the nozzle by the outer eddy.

A similar arrangement with two concentric nozzles, fed at the end instead of tangentially, may be used, although not so advantageously, to form a jet comprising two non-rotary coaxial streams of different flow velocities, the inner stream being composed of a protective gas flowing at low velocity, and the outer stream of a common gas, for example air, flowing at a higher velocity.

In the variant shown in FIGS. 6 to 8, the welding gun has a central nozzle 41, of circular section, through which a wire-guide 42 passes longitudinally in the usual manner. This nozzle has a flat tangential inlet 43, formed by a slit elongated longitudinally of the nozzle and forming the end of a conduit 44. This slit is disposed so that on entering the nozzle a fluid stream rotates therein in an anti-clockwise direction when one is facing the outlet 45 of the nozzle. The conical end of the nozzle has, at some distance from the outlet 45, a circular enlargement 46 threaded on the outside, onto which a conical outer nose 47 is screwed, which forms with the wall of the inner nozzle 41 an annular conduit or nozzle 48. The wider end of the nose 47 has an inwardly projecting flange 49 which is tapped internally for screwing onto the enlargement 46. This flange 49 is locally interrupted at 50 for part of its circumference and the wall of the nose 47 is locally thickened outwards at the same place. The flange 49 of the outer nose 47 abuts on an outer flange 51 of the nozzle 41, the latter flange being formed locally with an aperture 52 in register with the interruption 50 in the flange 49 and being enlarged externally round the aperture 52. This enlargement and the aperture 52 are circularly longer than the enlargement and the aperture 50 of the nose 47. The enlargement of the flange 51 is extended along the outer wall of the nozzle 41 by a hollow enlargement 53, one end of the interior of which communicates with the aperture 52 and the other end, by an aperture 54 in the enlargement wall 53, with a conduit 55 formed in a local circular enlargement 56 of the nozzle 41, at the level of the tangential inlet and of the conduit 44 with which it communicates. A screw 57 engaging in a tapped boss 58 passes through the enlargement wall 56 and into the conduit 55; screwing the screw 57 to a greater or less extent into the boss 58 varies the passage section of the conduit 56 and hence the flow in the annular nozzle 48. Another outer boss 59 on the wall of the enlargement 56 is formed with an axial aperture 60 which opens into the conduit 55 downstream of the screw 57; this boss is threaded externally so that a cap 62 blocking the aperture 60 can be screwed onto it. The boss 59 thus forms a connection which can receive instead of the cap 62, a conduit for connection to a pressure source of a protective gas. The detachable nose 47 extends in a downstream direction the outlet of the nozzle 41 so as to arrive substantially at the same distance from the axis as the latter, in order to eliminate the risk of blocking of the annular aperture by particles of metal emitted by the pool. A porous ring 62, made of calcined metal and wedged fluid-tightly between the conical walls of the nozzle 48 by screwing the detachable nose 47, is disposed in the annular nozzle 48. This ring is therefore easily removable. The conduit 44 has a cross-section which develops upstream and causes it to change from a narrow slit to a circle; it is also bent for connection to the handle 63, which may be of a conventional type or the type described earlier. A throttling element, for example the screw 64, is interposed in this conduit 44, so that the passage section can be adjusted or flow interrupted completely.

When in use, the gun being connected in the ordinary way to a pressure source of protective gas, the latter is supplied by the conduit 44 and enters tangentially through the slit 43 the central nozzle 41, resulting in the formation here of free vortex having a tangential velocity and an internal reduced pressure which increase from the circumference to the axis; this vortex issues round the central wire-guide and wire (not shown). If it issued immediately into the air by leaving the nozzle 41, it would be charged with a considerable quantity of air substantially equal to its own volume; instead, it is surrounded, immediately after it has issued from the nozzle 41, by an annular stream of protective gas issuing from the annular nozzle 48 and formed, through the porous distributing ring 62, by a flow derived from the conduit 44, through the conduit 55, the aperture 54, the conduit 53 and the aperture 50 in the flange 49. The porous ring 62 acts as a distributing means for equalising the flow over the whole of the annular section of the nozzle 48. The delivery of this derived flow is controlled by the screw 57 so that on entering the central eddy it reduces or eliminates the reduced pressure prevailing within the latter. The jet due to the interpenetration of these two streams can thus be deprived of any traces of free oxygen and atmospheric humidity, or, on the other hand, it may contain any percentage of the same, or of nitrogen, that may be desired in given cases. Turning the screw 57 varies in opposite directions the delivery of the central nozzle and that of the annular nozzle. Turning both screws 57 and 64 varies these deliveries in the same direction, at the same time varying, or not varying, their ratio.

The conduit 55 may also be completely blocked by the screw 57 and the connection 59 connected to a pressure source of a protecitve gas, different to the one of that passes through the central nozzle 41, so as to produce the desired protective mixture at the outlet of the gun.

The gun that has just been described may be modified, firstly by replacing the nozzle 41 by a nozzle without a tangential inlet and in the form of a conventional nozzle which the protective gas enters parallel with the axis, secondly by connecting the connection 59 to a compressed-air source, and finally by eliminating the conicity of the nozzles so as to make them cylindrical or slightly widened, the porous distributing ring being retained or otherwise as desired. The composite jet issuing from such a gun is then composed of a central core of the protective gas flowing at a low velocity, in contact with an annular stream of air which surrounds it and flows at a much higher velocity. This stream of air ventilates the space round the place being welded and its presence makes it more difficult for external disturbances, for instance transverse air currents, to deflect the protective core. If it is desired to rotate one or other of the two streams, or both of them, any known means for generating a force vortex may be used.

The invention is not, of course, limited to the details illustrated or described, which have only been given by way of example. It also applies to electric welding with a protective flux, with the wire or ring held in the hand, for example under argon with a tungsten wire to supply the current. The invention also, of course, includes semi-automatic or automatic welding equipment and apparatus with guns or torches according to the invention, and to any semi-automatic or automatic hand-welding sets in which separate conduits connect different protective-gas sources to the same gun or torch.

What we claim is:

1. In a process for electric-arc welding using a consumable welding electrode and a gaseous protective jet coaxially surrounding said electrode and the arc issuing therefrom, forming at least the innermost part of said jet as a free spiral vortex rotating both around said electrode and said arc in a direction such that the electron deviation in said vortex by the electromagnetic field created by said vortex which is ionised by the arc will be centripetal.

2. In a process as in claim 1, said vortex rotating in anti-clockwise direction when viewed in the direction opposite to the flow direction of the jet.

3. In a process for electric-arc welding using a consumable welding ferrous electrode and a gaseous protective jet coaxially surrounding said electrode and the arc issuing therefrom, forming at least the innermost part of said jet as a free spiral vortex rotating both around said electrode and said arc in a direction such that the electromagnetic field created by the rotation of the vortex ionised by the arc has the same direction as the flow of molten electrode material, whereby the latter is furthered and made quiet.

4. In a process as in claim 3, said vortex rotating in anticlockwise direction when viewed in the direction opposite to the flow direction of the jet.

5. An electric-welding apparatus of the class of the electric-welding guns and torches, including a body, means within said body providing throughout the latter a passageway for a welding wire projecting from the apparatus, said body being provided around said means with a passageway an end of which is open to the atmosphere, duct means leading to said passageway to provide for the supply tangentially thereto of protective gas to be discharged through said end around said electrode as a protecting free spiral vortex onto the spot of welding, said means including a duct opening in said passageway and so directed that the resulting vortex will rotate in an anticlockwise sense when looked in the direction opposite to its flow direction.

References Cited

UNITED STATES PATENTS

| 3,027,446 | 3/1962 | Browning | 219—75 |
| 3,053,967 | 9/1962 | Gorman et al. | 219—74 |
| 3,082,314 | 3/1963 | Arata et al. | 219—75 |

JOSEPH V. TRUHE, Primary Examiner

J. G. SMITH, Assistant Examiner

U.S. Cl. X.R.

219—137